Patented Oct. 2, 1951

2,570,090

UNITED STATES PATENT OFFICE 2,570,090

CARBOXYPHENYLPOLYSILOXANE-POLY-HYDRIC ALCOHOL COPOLYMERS

Arthur J. Barry and John W. Gilkey, Midland, Mich., assignors to Dow Corning Corporation, Midland, Mich., a corporation of Michigan No Drawing. Application July 5, 1949,
Serial No. 103,176

4 Claims. (Cl. 260—75)

This invention relates to copolymers of carboxyphenylpolysiloxanes and polyhydric alcohols.

It is an object of this invention to prepare novel heat stable materials which are intermediate in properties between polysiloxane resins and organic resins.

Another object of this invention is to provide a method for thermosetting diorganosiloxane resins at relatively low temperatures and in a short time. Other objects and advantages will be apparent from the following description.

This invention relates to copolymers of carboxyphenylpolysiloxanes and polyhydric alcohols wherein the carboxyphenylpolysiloxanes have a degree of substitution of from 1.9 to 3 organic radicals per silicon atom, said radicals being carboxyphenyl, tolyl, methyl and phenyl radicals. In the polysiloxane there is from one carboxyphenyl radical per 4000 silicon atoms to one carboxyphenyl radical per silicon atom and there is at least two carboxyphenyl radicals per siloxane molecule. The polyhydric alcohols are ethylene glycol, glycerol and bis-hydroxymethyldimethylsilane. In the copolymers the polysiloxane and alcohol are linked together by

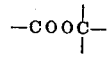

linkages and there is from one part by weight alcohol per 300 parts by weight polysiloxane to three parts by weight alcohol per part by weight polysiloxane.

The carboxyphenylpolysiloxanes employed in this invention are more fully described in the applicant's copending application Serial No. 103,175 filed concurrently herewith. In the copending application it is shown that carboxyphenylpolysiloxanes may be prepared by the oxidation of tolyl siloxanes. The oxidation may be accomplished in any appropriate manner but preferably it is carried out by heating the tolyl siloxane in contact with aqueous alkaline potassium permanganate. Under such conditions the methyl of the tolyl group is oxidized to a carboxyl group. Another method of preparing carboxyphenylsiloxanes is by preparing a Grignard reagent from halogenophenylsiloxanes, carbonating the Grignard with $CO_2$ and then acidifying the carbonated material.

The carboxyphenylsiloxanes employed in this invention may be either homopolymers or copolymers. The homopolymers may be represented by the formulae $(HOOCC_6H_4RSiO)_x$ and $(HOOCC_6H_4R_2Si)_2O$ where R is tolyl, phenyl and methyl.

The copolymeric siloxanes are composed mainly of siloxane units of the type $R_2SiO$ and $R_3SiO_{1/2}$ where R is carboxyphenyl, tolyl, phenyl or methyl. However small amounts of $SiO_2$ and $RSiO_{3/2}$ may be present. In all cases, however, the various siloxane units are so proportioned that the degree of substitution of the polysiloxanes is from 1.9 to 3 organic radicals per silicon atom.

Copolymeric siloxanes containing carboxyphenyl groups attached to the silicon atoms, may be prepared by any appropriate method. For example, a copolymeric siloxane containing silicon bonded tolyl groups may be oxidized with potassium permanganate so that the tolyl groups are converted into carboxyphenyl groups. In such a method, the amount of permangante employed may be sufficient to oxidize all of the tolyl groups or only part of the tolyl groups. Another method is to catalytically copolymerize carboxyphenylsiloxanes with other types of siloxanes. The catalysts employed for such copolymerization are alkali metal hydroxides, strong acids, alkali metal salts or organosilanols, alkali metal alkoxides and salts of carboxylic acids.

In all the polysiloxanes within the purview of this invention there is from one carboxyphenyl radical per 4000 silicon atoms to one carboxyphenyl radical per silicon atom and there are at least two carboxyphenyl radicals per molecule of polysiloxane.

When carboxyphenylpolysiloxanes are mixed with alcohols and heated at temperatures from 100° C. to 200° C., a reaction takes place between the carboxyl groups and the alcohol OH groups to produce an ester linkage with the elimination of water. When both the siloxane and the alcohol are polyfunctional the product will be a copolymer of the two. The physical state of such a copolymer depends upon the degree of functionality of the reactants and the proportions of each employed. Thus, when both the siloxane and the alcohol are difunctional, the copolymer will be a fluid composed of linear or cyclic molecules. The chain length of the molecules depends upon the relative proportions of the reactants. When the siloxane and the alcohol are employed on an approximately equimolar basis, the chain length obtainable is at a maximum.

If either the siloxane or the alcohol or both are trifunctional, cross-linking of the molecules may take place to produce insoluble and infusible copolymers. When a difunctional siloxane such as tetramethyl 1,3 di-p-carboxyphenyldisiloxane is reacted with glycerol, it is preferred that the reactants be employed in amount from one mol of siloxane to 0.5 mol of glycerol to one mol of siloxane to 1.5 mols of glycerol.

Siloxaness containing three or more carboxyphenyl groups per molecule which are thermoset to an insoluble and infusible state when reacted with either di- or tri-functional alcohols. In such cases the weight ratio of alcohol to siloxane required to produce thermosetting varies with the molecular size of the siloxane. Thermosetting will take place with weight ratios as low as one part alcohol per 300 parts of polysiloxane. Such copolymers contain relatively small amounts of alcohol and thus retain essentially all of the properties of the original polysiloxane.

Carboxyphenylsiloxanes may be reacted with any polyfunctional alcohol to produce copolymers. However, the preferred alcohols are ethylene glycol, glycerol and bis-hydroxymethyl-dimethylsilane. The first two are well-known commercial products. Bis-hydroxymethyldimethylsilane may be prepared by the method of John L. Speier, Journal of American Chemical Society, vol. 70, page 1400 (1948).

The materials of this invention may be employed per se as paint vehicles, coating agents for glass and for insulation of electrical conductors. In connection with the latter application, an electrical conductor may be coated with a soluble carboxyphenylsiloxane having admixed therewith a polyhydric alcohol. The coated wire can then be heated and the siloxane will react with the alcohol to form an infusible, solvent-resistant coat.

In addition, the copolymers of this invention may be modified by reacting them with other polyfunctional materials such as dibasic organic acids and polyfunctional amines.

The following examples are illustrative only.

Example 1

4 g. of tetramethyl 1,3 dicarboxyphenyldisiloxane and 10 g. of dry ethylene glycol were mixed and heated at 150° C. for 90 minutes. The reaction product was extracted with 18 ml. of hot carbon tetrachloride (in which both reactants are insoluble) and the extract was filtered and the solvent was evaporated. There was obtained 2.1 g. of a clear, brown resinous thermoplastic material. This material could be drawn out into long thread-like strands. The material was shown by analysis to be a copolymer of tetramethyl 1,3-p-dicarboxyphenyldisiloxane and ethylene glycol.

Example 2

4 g. of tetramethyl 1,3 di-p-carboxyphenyldisiloxane and 10 g. of glycerol were mixed and heated at 140° C. to 170° C. for 2 hours. The product was extracted with water to remove unreacted glycerine and the residue was a clear, viscous, thermoplastic material which was a copolymer of tetramethyl 1,3 di-p-dicarboxyphenyldisiloxane and glycerol. A drop of the copolymer was placed on a glass slide and heated 2½ hours at 180° C. The resulting material strongly adhered to the glass and was hard and flexible.

Example 3

5 g. of a tetramethyl 1,3 di-p-carboxyphenyl disiloxane and 3 g. of bis-hydroxymethyldimethylsilane were mixed and heated at 180° C. for 15 minutes. The product was a copolymer of the two reactants and was a clear, viscous liquid. When the copolymer was placed on glass and heated 2½ hours at 180° C., a resinous coating which showed excellent adhesion to the glass, was obtained.

Example 4

A carboxyphenylsiloxane was prepared as follows. 2 grams of tetramethyl 1,3 di-p-carboxyphenyldisiloxane and 10 g. of octamethylcyclotetrasiloxane was refluxed with 10 g. of potassium hydroxide, 45 ml. of ethanol and 5 ml. of water. After 40 minutes the mixture was cooled and washed until neutral. The wash mixture was extracted with ether and the solvent was evaporated. This copolymeric siloxane was reacted with glycerol by mixing samples of the siloxane with glycerol and heating each mixture at 180° C. for 21 hours. The results with various samples is shown in the table below:

| $\dfrac{\text{Wgt. of glycerol}}{\text{Wgt. of fluid}}$ Ratio | Physical state of copolymer obtained |
| --- | --- |
| 1/175 | A viscous fluid. |
| 1/50 | Clear, soft gel. |
| 1/25 | Firm gel. |
| 1/7.5 | Do. |

Example 5

A copolymeric siloxane was prepared as follows. 15 g. of tolyl methylsiloxane was dissolved in pyridine and refluxed 15 minutes with .006 mol of KMnO$_4$. Water was added and the pyridine was steam distilled. The mixture was filtered and the filtrate was extracted with benzene. The benzene solution was acidified with HCl and washed neutral. Upon evaporation of the solvent a carboxyphenylsiloxane having one carboxyphenyl radical per 3900 silicon atoms was obtained.

One drop of glycerol was added to a 2 g. sample of the above carboxyphenylsiloxane and the mixture was heated 25 hours at 180° C. Reaction occurred causing gelation of the fluid. In a blank run where no glycerine was added the siloxane was unchanged after 25 hours at 180° C.

Example 6

When a copolymeric siloxane is prepared from 2 g. of tetramethyl 1,3 di-p-carboxyphenyldisiloxane and 10 g. of tetramethyltetraphenyltetrasiloxane in the manner of Example 4, and the siloxane is reacted with glycerol in the ratio of one part by weight glycerol to 7.5 parts by weight siloxane in the manner of Example 4, a gel is obtained.

That which is claimed is:

1. A polyester composed of a polysiloxane having a degree of substitution of from 1.9 to 3 organic radicals per silicon atom, said radicals being selected from the group consisting of carboxyphenyl, tolyl, phenyl and methyl radicals in which polysiloxane there is from one carboxyphenyl radical per 4000 silicon atoms to one carboxyphenyl radical per silicon atom, there being at least two carboxyphenyl radicals per siloxane molecule, and a polyhydric alcohol selected from the group consisting of ethylene glycol, glycerol and bis-hydroxymethyldimethylsilane, in which polyester the polysiloxane and the alcohol are linked together by

linkages, there being in said polyester from one part by weight alcohol per 300 parts by weight polysiloxane to 2.5 parts by weight alcohol per part by weight polysiloxane.

2. A polyester composed of tetramethyl 1,3 di-p-carboxyphenyldisiloxane and ethylene glycol in which polyester the siloxane and glycol are linked together by

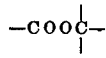

linkages and the siloxane and glycol are present in approximately equimolar amounts.

3. A polyester composed of tetramethyl 1,3 di-p-carboxyphenyldisiloxane and bis-hydroxymethyldimethylsilane in which polyester the siloxane and the polyhydric alcohol are linked together by

linkages and the siloxane and alcohol are present in approximately equimolar proportions.

4. A polyester composed of tetramethyl 1,3 di-p-carboxyphenyldisiloxane and glycerol in which the siloxane and glycerol are linked together by

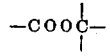

linkages and in which polyester the relative amounts of glycerol and siloxane are from 0.5 mol of glycerol per mol of siloxane to 1.5 mols of glycerol per mol of siloxane.

ARTHUR J. BARRY.
JOHN W. GILKEY.

REFERENCES CITED

The following references are of record in the file of this patent:

UNITED STATES PATENTS

| Number | Name | Date |
|---|---|---|
| 1,970,510 | Ellis | Aug. 14, 1930 |